(12) United States Patent
Coenraets

(10) Patent No.: US 8,608,457 B2
(45) Date of Patent: Dec. 17, 2013

(54) DEVICE WITH A DRUM WITH A DRIVE MOTOR MOUNTED THEREIN

(75) Inventor: Benoit Coenraets, Brussels (BE)

(73) Assignee: Dynaco Europe NV, Moorsel-Aalst (BE)

( * ) Notice: Subject to any disclaimer, the term of this patent is extended or adjusted under 35 U.S.C. 154(b) by 1173 days.

(21) Appl. No.: 11/665,451

(22) PCT Filed: Oct. 17, 2005

(86) PCT No.: PCT/IB2005/053404
§ 371 (c)(1),
(2), (4) Date: May 27, 2008

(87) PCT Pub. No.: WO2006/040747
PCT Pub. Date: Apr. 20, 2006

(65) Prior Publication Data
US 2009/0208351 A1 Aug. 20, 2009

(30) Foreign Application Priority Data
Oct. 15, 2004 (BE) .................................. 2004/0509

(51) Int. Cl.
*F04B 39/06* (2006.01)
*E06B 9/56* (2006.01)

(52) U.S. Cl.
USPC .......................... 417/368; 417/366; 160/311

(58) Field of Classification Search
USPC .......... 160/309, 310, 238, 133, 311; 417/366, 417/368
See application file for complete search history.

(56) References Cited

U.S. PATENT DOCUMENTS

| | | | | |
|---|---|---|---|---|
| 1,858,867 A | * | 5/1932 | Ulrich | 160/309 |
| 3,285,089 A | * | 11/1966 | Tsugawa | 74/421 R |
| 4,171,190 A | * | 10/1979 | Hudson | 417/350 |
| 4,201,189 A | * | 5/1980 | Saunders | 126/630 |
| 4,392,392 A | * | 7/1983 | Perisic et al. | 475/4 |
| 4,615,371 A | * | 10/1986 | Clauss | 160/22 |
| 4,644,813 A | * | 2/1987 | Whitehouse et al. | 74/431 |
| 4,683,932 A | * | 8/1987 | Bubendorff | 160/133 |
| 4,974,658 A | * | 12/1990 | Komatsu et al. | 160/310 |
| 5,397,950 A | * | 3/1995 | Norbury et al. | 310/91 |
| 5,747,900 A | * | 5/1998 | Nakamura et al. | 310/58 |
| 6,158,978 A | * | 12/2000 | Norbury, Jr. | 417/350 |
| 6,412,539 B1 | * | 7/2002 | Kuribayashi et al. | 160/310 |
| 6,422,965 B1 | * | 7/2002 | Balli et al. | 475/149 |

FOREIGN PATENT DOCUMENTS

| | | |
|---|---|---|
| DE | 1134189 B1 | 8/1962 |
| FR | 790394 A | 11/1935 |
| FR | 2604203 A2 | 3/1988 |
| FR | 2716922 A1 | 9/1995 |
| JP | 07139271 A | 9/1995 |
| JP | 2004251036 A | 9/2004 |
| WO | 0155548 A1 | 8/2001 |

\* cited by examiner

*Primary Examiner* — Charles Freay
*Assistant Examiner* — Alexander Comley
(74) *Attorney, Agent, or Firm* — Browdy and Neimark, PLLC

(57) ABSTRACT

A device for driving a drum (1) about the axis thereof, including a motor (2) which is mounted at least partially inside the drum (1) and a transmission (7) disposed between the motor (2) and the drum (1), characterized in that it further includes a device (10) enabling a forced current of cooling air to be created in a space (13,14) between the motor (2) and an inner wall of the drum (1).

16 Claims, 2 Drawing Sheets

DEVICE WITH A DRUM WITH A DRIVE MOTOR MOUNTED THEREIN

The present invention concerns a device comprising a drum working in conjunction with a drive motor mounted at least partially inside the drum.

A major problem with the known devices of this type is that, as the motor is largely enclosed in the drum, the latter risks being heated to relatively high temperatures in the order of 110° C., when the ambient temperature is in the order of magnitude of 22° C. and when it very frequently has to work at high speeds. Consequently, this restricts the use of such a device when it is designed to drive a shutter for screening a bay or another opening.

Such devices are not suitable for example to vertically drive a mobile gate at a speed in the order of 3 to 5 m/s and with an opening and closing frequency in the order of 400 times per hour. This may be the case in much frequented places.

Thus, control means are usually provided allowing to temporarily put the motor out of order so as to avoid damage to certain heat-sensitive parts situated inside the drum near the motor, such as electronic circuits.

Indeed, it has been found that a conventional cooling of the motor by air that is sent inside the latter between the rotor and the stator does not allow for a sufficient cooling.

One of the main aims of the present invention is to provide a very efficient solution to this problem in a technically and economically justified manner.

To this end, the device according to the invention comprises means which make it possible to create a forced current of cooling air in a space provided between the outer wall of the motor and the inner wall of the drum.

Advantageously, means are provided to refresh the cooling air in the above-mentioned place in a substantially continuous manner at least while the motor is operational.

In particular, the device according to the invention comprises, at least along one side of the motor, means which make it possible to guide the air current along the external lateral wall of the motor.

According to a particularly advantageous embodiment, the motor is mounted on a frame situated outside the drum and having, opposite the motor, an opening through which air can be introduced in the drum so as to form the above-mentioned air current.

According to a preferred embodiment of the invention, the drum has a passage for the air current on the inside via which the air can be evacuated from said drum after it has been displaced along the exterior wall of the motor.

Other details and particularities of the invention will become clear from the following description, given as an example only without being limitative in any way, with reference to the accompanying drawings of a few particular embodiments of the device according to the invention.

Figure 6:
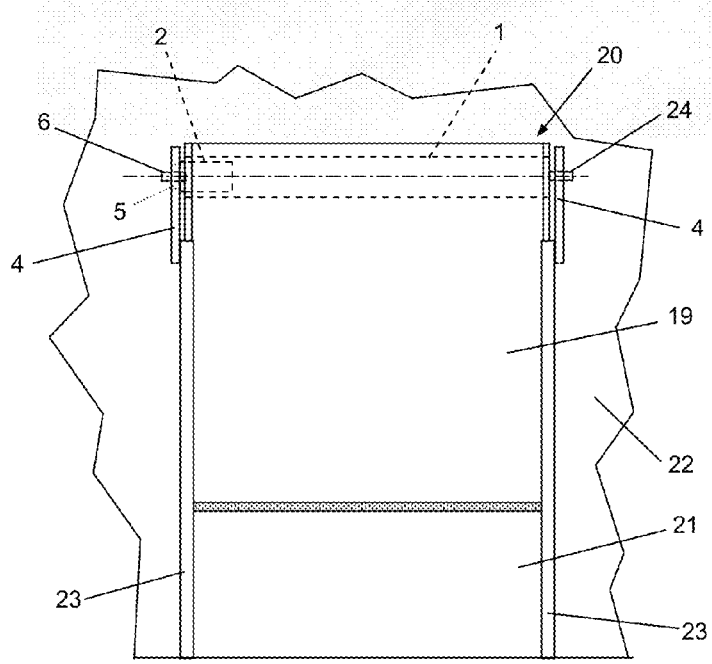

FIG. 6 schematically represents an elevation of a preferred application of the device according to the invention.

In the different drawings, the same reference figures refer to identical or to analogous elements.

The invention in a general way concerns a device comprising (a) a drum driven by a motor that is at least partially mounted inside the drum, mainly co-axial to the latter, and (b) means which make it possible to cool said motor in a very efficient manner, and possibly accessories that are contained in the drum as well.

It has been found that, in a totally unpredictable manner, means are concerned that make it possible to create a forced current of cooling air along the exterior wall of the motor, for example a fan mounted on the drive shaft of the motor.

A device may be concerned that is used to close off a bay or another opening. In this particular case, the drum is designed to move a shutter, formed for example of a curtain, which may possibly be unrolled from the drum to close off the bay or the other opening and which may be rolled up on the latter so as to open the bay or the other opening. To this end, the shutter must be flexible at least in the roll-up direction.

In other cases, the shutter can simply be either or not deviated above the bay or other opening.

By the term 'forced current' should be understood, within the context of the present invention, an air current which, as opposed to a natural air current, is obtained by implementing mechanical means such as a fan formed of a propeller or a turbine mounted on the transmission shaft of the motor, blades that are fixed to the inner wall of the drum, a blower or an extractor possibly mounted outside the drum, etc. Thus, a conventional motor can be used with a fan mounted in a casing on one side of the latter.

Surprisingly, the cooling makes it possible to constantly maintain the temperature of the motor at about 60° C. when the ambient temperature is in the order of magnitude of 22° C.

Also according to the invention, means are provided to refresh the cooling air about the motor in a substantially continuous manner at least while the latter is operational.

Figure 1:
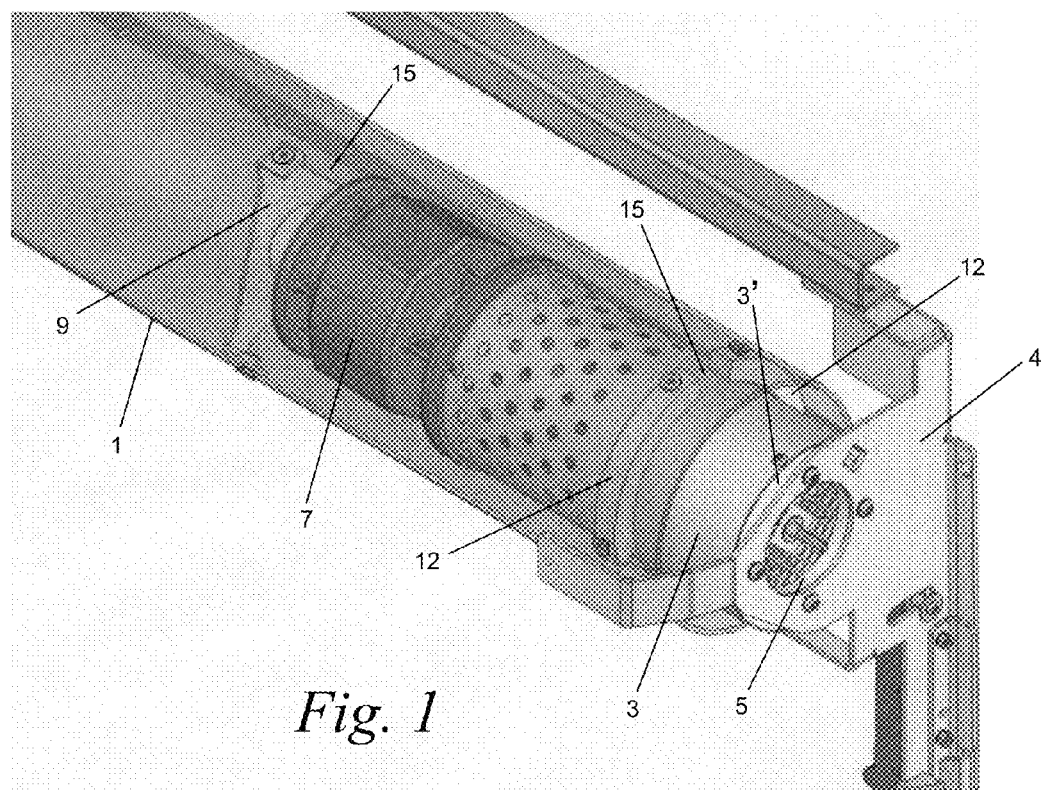
FIG. 1 is a schematic view in perspective of a first embodiment.
Figure 2:
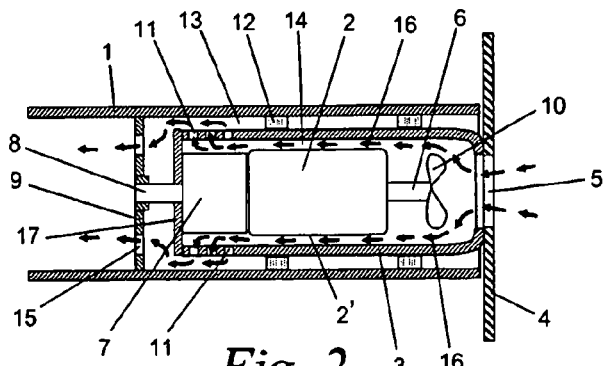
FIG. 2 is a schematic representation to a smaller scale of a longitudinal axial section of a variant of the first embodiment.

FIG. 1, which concerns a first embodiment, shows a device for driving a drum 1 about the axis thereof by means of a motor 2 which is mounted entirely inside the latter, whereas FIG. 2 shows a variant of this first embodiment.

In FIG. 1, for clarity's sake, the drum 1 is represented in a transparent manner, such that the contents of the drum can be distinguished.

The motor 2 is fixed inside a guide roller 3, which is mounted with one of its far ends on a frame 4 situated outside the drum 1. In a variant shown in FIG. 2, the roller 3 is extended around transmission means 7 and it is closed by means of a disk 17, whereas in FIG. 1 the roller does not pass beyond the motor 2.

The frame 4 has, opposite the motor 2, a circular opening 5 that is co-axial to the shaft 6 of the motor 2, one of the far ends of which penetrates in said opening 5. The other far end of the shaft 6 is connected to transmission means 7 comprising a reducing socket, known as such, with a drive shaft 8.

The shaft 8, co-axial to the shaft 6, is connected to an element 9 fixed to the inner wall of the drum 1, such that the latter can be driven about its axis while the motor 2 is operational.

In this particular embodiment, and its variant, the means for creating the forced current of air are formed of a propeller 10 mounted on the shaft 6 of the motor 2, inside the guide roller 3 and on the side of the frame 4, opposite the opening 5.

The roller 3 has a series of openings 11 that are evenly distributed in the part of the latter situated on the side of the motor 2 opposite the side where the propeller 10 is situated.

A major characteristic of this embodiment is that the roller 3 is maintained substantially co-axial to the drum 1 by means of guide blocks 12 in the form of an arc that are fixed to the inner wall of the drum 1, in such a way that a free space 13 is preserved between the exterior wall 2' of the motor 2 and the inner wall of the drum 1.

As the drum 1 rotates, the roller 3 slides against said guide blocks 12, which are made of a material with a relatively low coefficient of friction and which resists relatively high temperatures well.

The guide blocks 12 and the element 9 have passages 15 for the cooling air current, such that the air current can be evacuated via the far end of the drum 1 opposite the one where the motor 2 is mounted.

The element 9 is preferably made of a sheet metal which can be somewhat elastically deformed so as to allow for a transversal movement of the shaft 6 of the motor 2 caused by its operation. As a result, the axis of the drum 1 and the shaft 6 of the motor 2 do not need to be perfectly aligned. Moreover, the roller 3 can be mounted with a certain play between the guide blocks 12, for example in the order of 4 mm, without this causing any vibrations of the motor 2 when it is operational.

As soon as the motor 2 is started, the propeller 10 sucks in outside air through the opening 5 in the frame 4, thus creating a forced air current at the entry of the guide roller 3. This current is deviated to the exterior wall 2' of the motor 2 into the space 14 between the latter and the roller 3, as shown by the arrows 16, to then pass through the openings 11 into the space 13 and to be evacuated outside the drum 1 through the openings 15 of the element 9. It should be noted that the front of the guide blocks 12 that make contact with the roller 3 is cooled in a very efficient way thanks to the passage of the air current along the inside of the latter.

Figure 3:
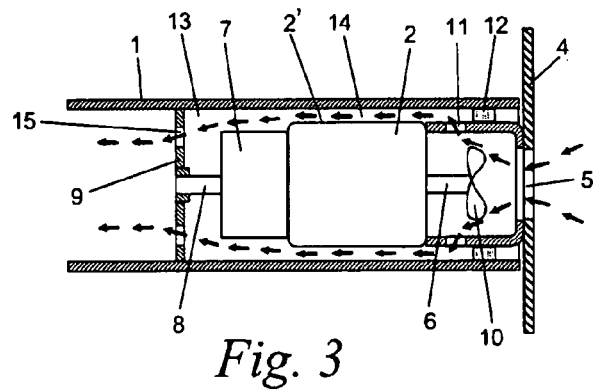
FIG. 3 is a schematic representation of a section analogous to that in FIG. 2 of a second embodiment.

The second embodiment, as is illustrated very schematically in FIG. 3, can mainly be distinguished from the first embodiment and its variant in that the guide roller 3 is mounted to the side of the motor 2 which is directed towards the frame 4 and in that the air current is deviated through said roller 3 via openings 11 into the space 13. This space 13 extends along the exterior wall 2' of the motor 2.

In fact, said roller 3 can be formed of a conventional casing of the fan 10, known as such, in which openings 11 are provided. As opposed to the case of the particular embodiment represented in FIG. 3, the far end of said casing which is directed towards the frame 4 may comprise a deflector extending about the fan 10 and having a somewhat truncated shape which promotes the deviation of the air current towards the openings 11. Instead of separated openings 11, an annular opening can be provided which is obtained by fixing said casing at a certain distance from the motor 2.

Figure 4:
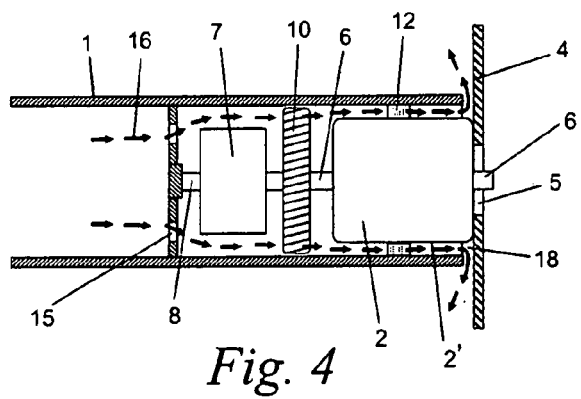
FIGS. 4 and 5 are respective sections analogous to the one in FIG. 3 of a third and a fourth embodiment.

The embodiment represented in FIG. 4 differs from the one illustrated in FIG. 3 in that the fan 10 is formed of a turbine mounted on the shaft 6 between the motor 2 and the transmission means 7.

Moreover, the cooling air current is sucked in through the openings 15 of the element 9 and is evacuated, after its passage along the exterior wall 2' of the motor 2, through the annular space 18 between the drum 1 and the frame 4.

Figure 5:
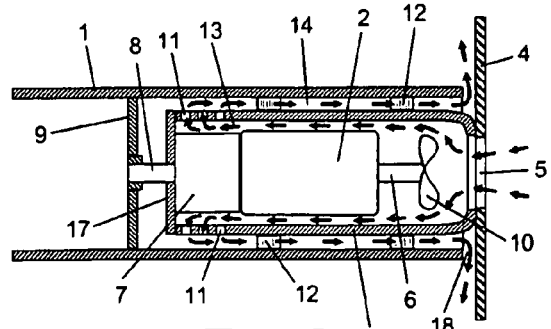

FIG. 5 concerns an embodiment which is mainly different from the preceding embodiments in that the direction of the air current, after it has passed along the exterior surface 2' of the motor 2, is inverted, after having gone through the openings 11 in the roller 3, in the space 14 between the latter and the inner wall of the drum 1. This is due to the fact that the element 9 blocks the drum 1 completely and thus does not provide any passages for the air current.

In the latter embodiment, the guide roller 3 is identical to the one of the first embodiment's variant, as well as the assembly of the motor 2 and the transmission means 7 in this roller 3.

Since, in these different embodiments, the far end of the shaft 6, on the side of the frame 4, is easily accessible via the opening 5 provided in the latter, it is possible to use a crank, not represented here, to manually put the motor 2 in motion in case of a failure of the latter, for example, to move a shutter, mounted on the drum 1, between its closed position and its open position.

However, a displacement of the air current in the same direction between both far ends of the drum 1 is preferred, as in this case the resistance to the displacement will be much smaller than in the case of an inverted air current as in the fourth embodiment. Moreover, a unidirectional displacement results in a rather marked stack effect.

FIG. 6 shows a gate 19 which can roll itself up about a drum 1 of the drive device according to the invention, illustrated in particular in FIGS. 1 to 5.

In this particular application, the device, indicated by reference FIG. 20, is mounted above a bay 21 provided in a wall 22. The gate 19 is formed for example of a plasticized cloth and it is fixed with its upper edge to the drum 1.

Thanks to the rotation in a particular sense of the drum 1, driven by the motor mounted inside the latter, the gate 19 can be lifted up to the opening of the bay 21. FIG. 6 shows the gate 19 in an intermediary position.

The lateral edges of the gate 19 are guided in sliding rails 23 provided in a frame which laterally confines the bay 21.

On the top part of this frame is fixed, on either side of the bay 21, a frame 4 situated outside the drum 1 and comprising the device 20.

In this case, the drum 1 rests with one of its far ends on the motor 2, which is mounted on one of the frames 4 by means of the guide roller 3, whereby the other far end of the drum 1 is mounted in a rotating manner, known as such, on the frame 4 provided on the other side of the drum 1 by means of a shaft 24 extending along the axis of the drum 1.

It should be noted that in such an application, the drive motor is loaded to a great extent, generally more than in other applications, as it must exert a pushing force as well as a tractive effort on the gate to be driven, and as it must overcome the resistance caused by the friction of the lateral edges of the gate in sliding rails.

Of course, the scope of the present invention is not restricted to the different embodiments described above: also other variants can be considered while still remaining within the scope of the invention.

Thus, it is possible to use a motor having two directions of rotation. When the direction of rotation is inverted, also the direction in which the cooling air current is displaced along the exterior wall of the motor will be inverted.

Instead of providing guide blocks between the guide roller and the inner wall of the drum, one could use wheels mounted either on the roller or on the inner wall of the drum. Moreover, these guide blocks could be formed of rings in which are provided ducts parallel to the axis of the drum so as to allow for the passage of the air current. It is also possible to mount the guide blocks on the exterior wall of the guide roller.

If necessary, the fan 10 can be mounted on the shaft 8 of the transmission 7 means anywhere inside the drum 1.

Finally, the use of the present drive device is not necessary limited to driving lifting gates.

The invention claimed is:

1. A device for driving a drum (1) about an axis thereof, comprising a motor (2) which is mounted at least partially inside the drum (1) and transmission means (7) provided between the motor (2) and the drum (1), whereby means (10) are provided enabling a forced current of cooling air to be created in a space (13,14) between the motor (2) and an inner wall of the drum (1), whereby the motor (2) is mounted on a frame (4) and at least partially inside a guide roller (3) for the air current, whereby the roller (3) extends at least partially about the motor (2) and makes it possible to guide the air current along an exterior wall (2') of the motor, wherein the drum (1) is mounted in a sliding manner and co-axially on the guide roller (3) while being supported by the roller (3) in such a way that the drum (1) can undergo a rotation about its axis in relation to the roller (3), wherein the motor (2) drives an element (9) fixed to the inner wall of the drum (1) such as to make the drum (1) to rotate about its axis, wherein said element (9) can be at least partly deformed in an elastic manner so as to allow for a limited transversal movement of the motor (2) in relation to the axis of rotation of the drum (1).

2. The device according to claim 1, characterized in that it comprises means (3), at least on a distal end of the motor (2), which make it possible to guide the air current along the exterior wall (2') of the motor (2).

3. The device according to claim 1, characterized in that it comprises means to continuously refresh the cooling air in the space (13,14), at least while the motor (2) is operational.

4. The device according to claim 1, characterized in that the means (10) to create the air current comprises at least one propeller mounted on a shaft (6) driven by the motor (2).

5. The device according to claim 4, characterized in that the propeller (10) is situated inside the guide roller (3), between the motor (2) and the frame (4).

6. The device according to claim 1, characterized in that the guide roller (3) has openings (11) distributed in a portion situated on a side of the motor (2) opposite where the means (10) for creating the forced air current are situated, in such a way that the air current can be evacuated through said openings (11) after having passed along the exterior wall (2') of the motor (2).

7. The device according to claim 1, characterized in that the frame (4) on which the motor (2) is mounted is situated outside the drum (1) and has an opening (5), opposite the motor (2), through which air can be introduced so as to create the air current.

8. The device according to claim 1, characterized in that the guide roller (3) carries the motor (2) and is mounted with a distal end directed towards the outside of the dram (1) on the frame (4).

9. The device according to claim 1, characterized in that the guide roller (3) works in conjunction with the inner wall of the drum (1) by means of guide blocks (12) and/or wheels mounted between the roller (3) and said inner wall.

10. The device according to claim 1, characterized in that the drum (1) has a passage for the air current, at least over a part of its length, which makes it possible to evacuate the air outside the drum (1) after it has been displaced along the exterior wall (2') of the motor (2).

11. The device according to claim 1, characterized in that the drum (1), having a tubular shape, is supported by the guide roller (3) in such a way that it allows the air current to pass from a distal end of the drum (1) directed towards the frame (4), on which the motor (2) is mounted, to the outside of the drum (1) located at an opposite distal end.

12. The device according to claim 1, characterized in that, the drum (1) has a tubular shape, and the element (9) is such that it allows the air current to pass from a distal end of the drum (1) directed towards the frame (4), on which the motor (2) is mounted, to the outside of the drum (1) located at an opposite distal end.

13. An installation for closing a bay or another opening comprising a gate which can roll up about a drum (1) when the gate is opened and which can unroll from the drum (1) when the gate is closed, characterized in that the installation comprises the device according to claim 1.

14. A device for driving a drum (1) about an axis thereof, comprising a motor (2) which is mounted at least partially inside the drum (1) and transmission means (7) provided between the motor (2) and the drum (1), whereby means (10) are provided enabling a forced current of cooling air to be created in a space (13,14) between the motor (2) and an inner wall of the drum (1), whereby the motor (2) is mounted on a frame (4) and at least partially inside a guide roller (3) for the air current, whereby the roller (3) extends at least partially about the motor (2) and makes it possible to guide the air current along an exterior wall (2') of the motor, wherein the drum (1) is mounted in a sliding manner and co-axially on the guide roller (3) while being supported by the roller (3) in such a way that the drum (1) can undergo a rotation about its axis in relation to the roller (3).

15. The device according to claim 1, wherein said means enabling a forced current of cooling air to be created comprises a component that is operative to produce a forced flow of air parallel to an axis of the motor.

16. The device according to claim 14, wherein said means enabling a forced current of cooling air to be created comprises a component that is operative to produce a forced flow of air parallel to an axis of the motor.

* * * * *